INVENTOR
SIDNEY DAVID KOBERNICK

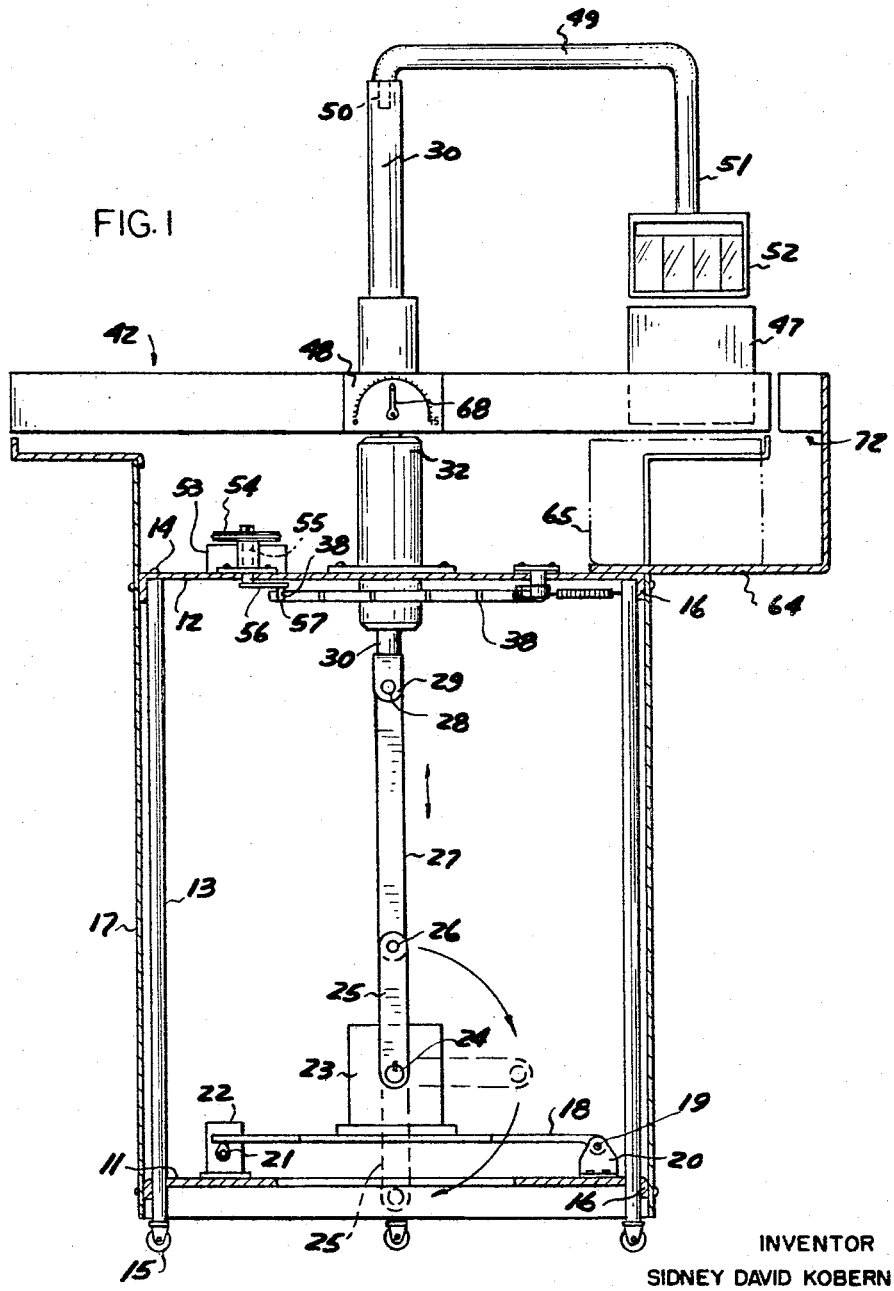

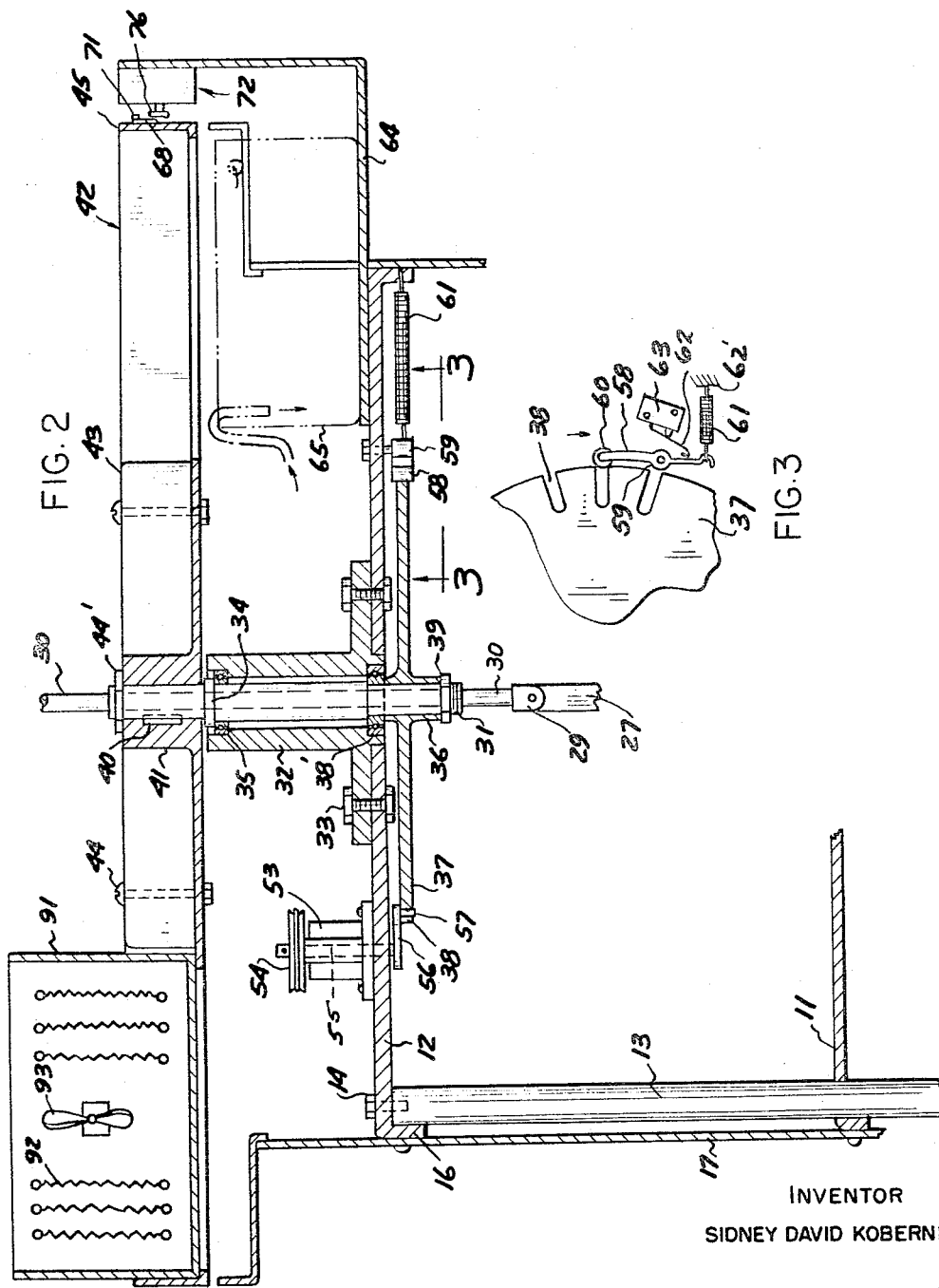

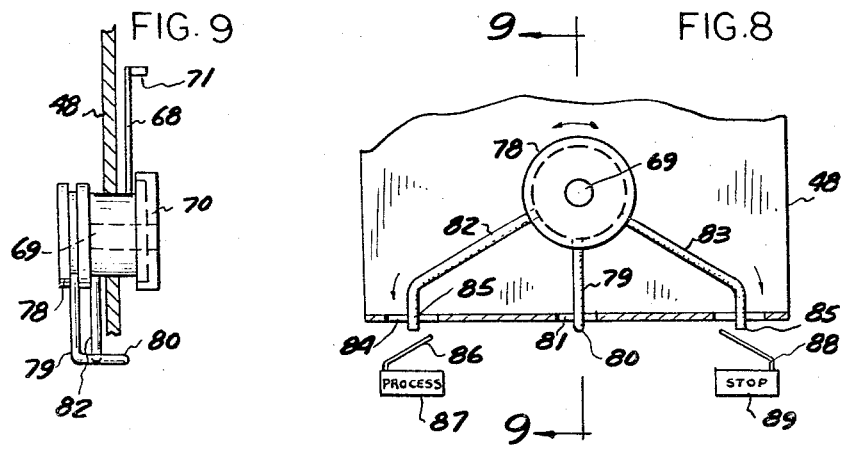
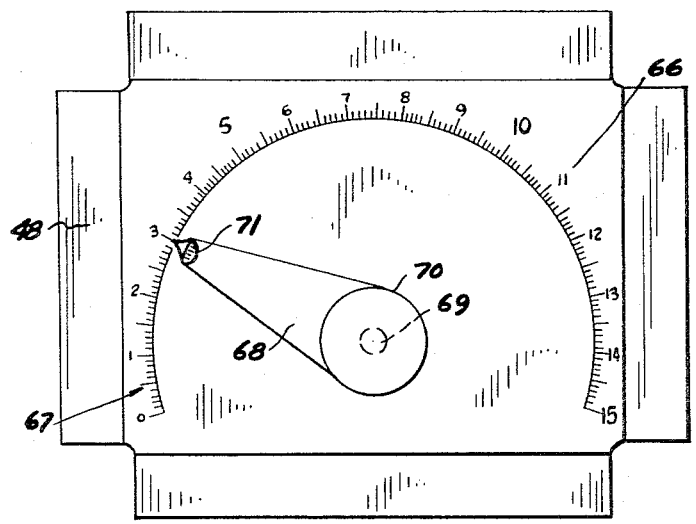
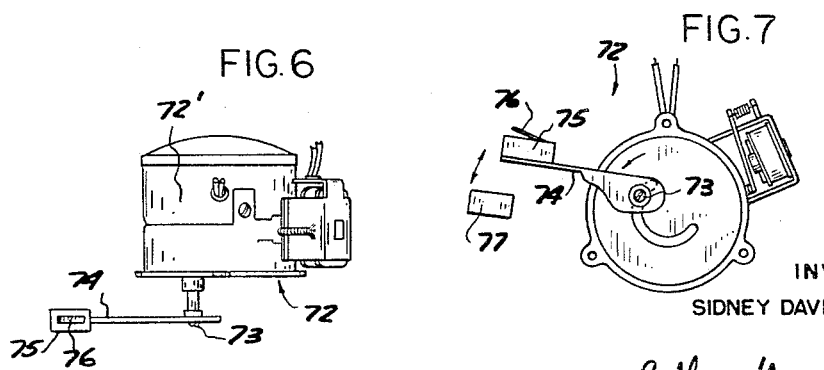

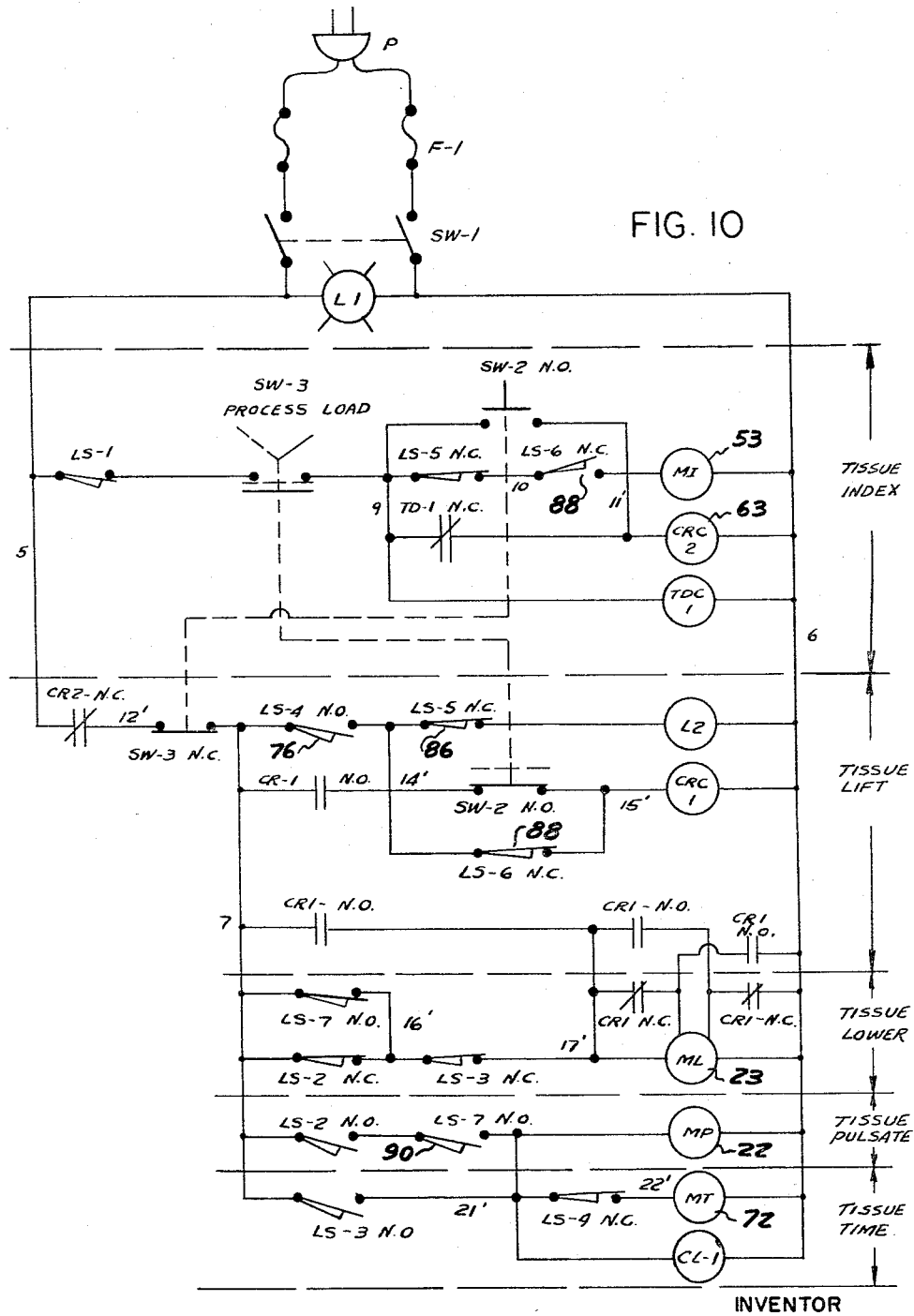

United States Patent Office 3,302,607
Patented Feb. 7, 1967

3,302,607
TISSUE-STAINING AND PROCESSING MACHINE
Sidney David Kobernick, 19370 Stratford Road,
Detroit, Mich. 48221
Filed Apr. 30, 1965, Ser. No. 452,186
13 Claims. (Cl. 118—11)

The present invention relates to a tissue-staining and processing machine.

It is an object of the present invention to provide a novel tissue-staining and processing machine by which the vertically adjustable slide carrier may be mounted over and above a compartmented turntable, with a plurality of tanks in said compartments containing various dyes and solvents used in a staining process and with power means for effecting intermittent incremental rotation of the turntable so as to present different tanks successively into the path of vertical reciprocal movement of the slide carrier, and by which various slides with tissue within the carrier are successively and for variable periods immersed within various dyes and solvents in the tanks, and provide for rinsing at any stage of the process.

As background for the present invention and for the purpose of staining tissue for microscopic examination, the tissue specimen is taken from the operating room and cut into thin slices or strips approximately three to four mm. in thickness. By a dehydrating process dipping in alcohol tanks, alcohol replaces the water in the strips. This is followed by a clearing process to eliminate the alcohol and substitute toluol, for example, a paraffin solvent. The tissue is then impregnated with paraffin at approximately 60° C. using several paraffin baths. At this temperature the toluol evaporates and is replaced by the paraffin. Such tissue processing may be accomplished by a modification of the present machine. The tissue is then placed in a mold and liquid paraffin is poured therein, to provide a solid block of paraffin wax which incorporates the tissue strip. This provides a convenient means by which the tissue strip may be cut into very, very thin slices using a Microtome machine which cuts thin slices off the bottom plane of the block of wax including the specimen to thus provide strips which are approximately four to ten microns in thickness. (50 microns=.003 inches.)

A slice produced is then mounted upon a glass slide and dried in an oven at approximately 55° C. which is under the melting point of the wax so that the slide is now ready for staining and for use with the present invention. The foregoing steps in preparing the slide for staining are conventional steps and are merely set forth for the purpose of background and for better understanding of the present process.

The staining of the tissue must be preceeded by the removal of all of the wax, i.e., a reversal of the process set forth eliminating the wax using the present apparatus. Accordingly, of the tanks above referred to, there are at least two or more tanks containing toluol, and tanks containing alcohol. Provision is also provided for an additional tank containing water for rinsing purposes. The foregoing steps are involved in the removal of the wax from the tissue specimen of the slide.

There are various staining processes each of which differs in detail and uses a plurality of different dyes and wherein the tissue upon the slide is removably immersed within a series of tanks in a succession of steps. The tanks contain various dyes into which the slide carrier is successively immersed for predetermined periods which are variable, and thereafter, dipped alternately or successively, into a water or rinsing tank.

It is another object to provide power and control means by which the turntable which mounts a series of tanks is positioned in a horizontal plane and is rotatable so that the tanks are successively positioned under the path of movement of the vertically reciprocal slide carrier.

It is another object to provide a device by which the various dipping steps take place in succession to complete a cycle of operation for a particular staining operation, depending upon the stains employed.

It is another object to provide a timing means in association with the control for reciprocal movement of the slide carrier by which the period of immersion of the slide carrier in a particular tank can be variably controlled selectively.

It is another object to provide thermostatically controlled heating or cooling for any of the staining or processing tanks as desired.

It is another object to provide for continuous limited vibrations of the slide carrier during the staining and rinsing operations.

These and other objects will be seen from the following specification and claims in conjunction with the appended drawings in which:

FIG. 1 is a fragmentary vertical section of the tissue-staining and processing machine.

FIG. 2 is a fragmentary broken away and sectioned view thereof.

FIG. 3 is a fragmentary section taken in the direction of arrows 3—3 of FIG. 2.

FIG. 5 is a front elevational view of an end wall of a turntable compartment with adjustable pointer and time dial.

FIG. 6 is a plan view of the timing mechanism.

FIG. 7 is an end view thereof.

FIG. 8 is a fragmentary front elevational view of the selector control.

FIG. 9 is a fragmentary section taken in the direction of arrows 9—9 of FIG. 8.

FIG. 10 is a schematic wiring diagram of the electrical circuit, motors and switches.

Figure 4:
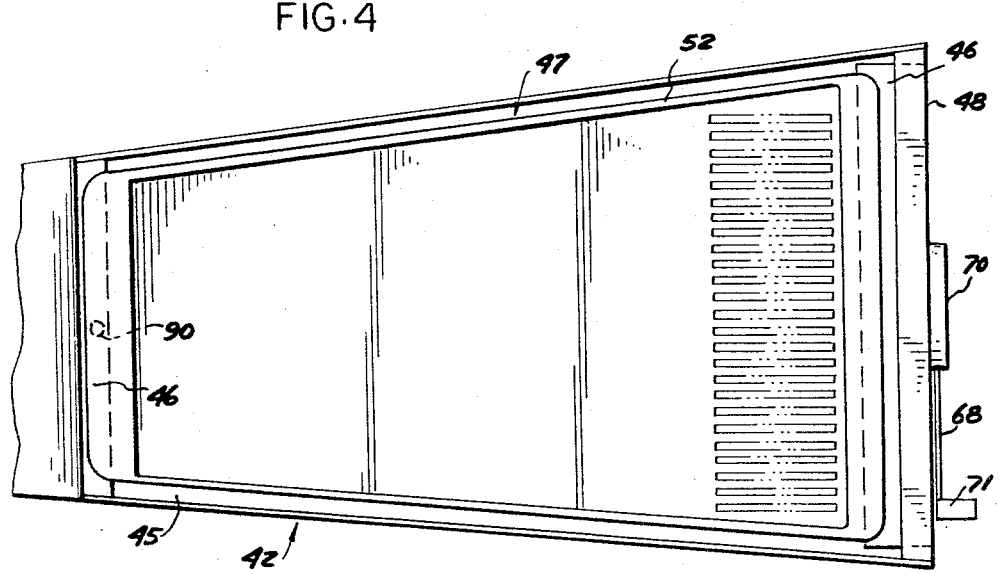
FIG. 4 is a fragmentary plan view of one of the turntable compartments, with tank and slide carrier.
Figure 11:
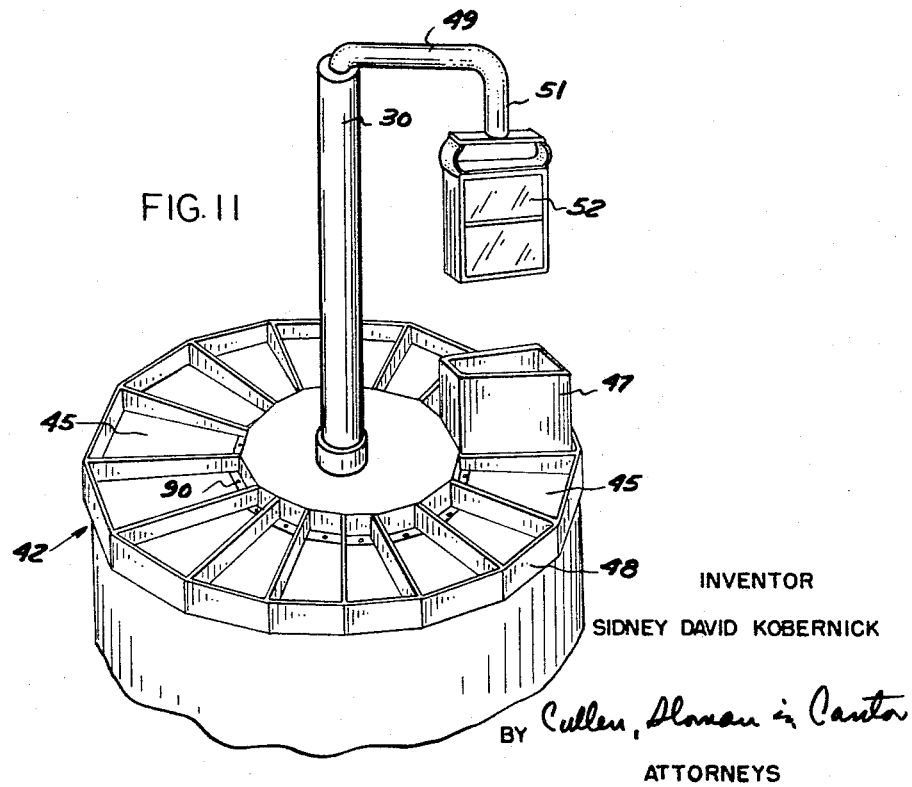
FIG. 11 is a fragmentary top perspective view of the tissue staining and processing machine.

It will be understood that the above drawings illustrate merely a preferred embodiment of the invention, and that other embodiments are contemplated within the scope of the claims hereafter set forth.

Housing

Referring to the drawing, FIG. 1 the tissue staining and processing machine includes a housing with apertured bottom platform 11, top platform 12, spaced upright legs 13 connected at 14 to the top platform and extending through corresponding apertures in the bottom platform and terminating in rollers 15. Platforms 11 and 12 have an annular flange 16 to which is secured the cylindrical body 17.

Crank motor for vertical reciprocations of slide carrier

Upon the interior of the housing is provided apertured platform 18 pivoted at 19 upon bracket 20 on platform 11. The free side of platform 18 supportably rests upon cam 21 driven by motor 22 upon platform 11. This provides continuous vibratory motion to crank motor 23 supported on platform 18.

Crank motor 23 has an intermittently rotatable output shaft 24 keyed to crank 25, which at its outer end is pivotably and flexibly connected at 26 to the vertically reciprocal link 27. Link 27 is pivotally connected at 28 by stirrup 29 to reciprocal shaft 30. Shaft 30 is mounted upon and projects above the housing assembly. Shaft 30 is guidably positioned through elongated upright bushing 31, of nylon, for illustration, which is rotatably mounted and supported upon upright journal block 32 secured at 33 to top plate 12. Bushing 31 includes an enlarged shoulder 34 supportably mounted upon journal block 32 with ball bearings 35 interposed, FIG. 2. The use of a rack and pinion for effecting reciprocal movements of link 27 is considered an equivalent mechanism.

Rotatable bushing 31 extends through and is keyed to collar 36 on peripherally apertured wheel 37 forming part of a Geneva movement. Wheel 37 is positioned below journal block 32 with ball bearing 38' interposed. Nut 39 is threaded over the lower end of bushing 31 and retainingly engages collar 36. Above journal block 32 bushing 31 is keyed at 40 to hub 41 of the horizontally disposed turntable 42. Flanged cover 43 overlies and is secured at 44, to the turntable. Nut 44' is threaded over the upper end of the bushing and bears against said cover.

Turntable

As viewed in FIGS. 1 and 4 turntable 42 coaxial to bushing 31 and shaft 30, includes a series of vertically apertured radially extending compartments 45 arranged in a circle at a radius corresponding substantially to the path of vertical movement of slide carrier 52 connected to reciprocal shaft 30.

Each compartment has an internal ledge 46 to supportably mount a tank 47 adapted to contain a dye or solvent or solution for use in tissue staining and processing of tissue slides. Each compartment has a planar upright end face 48, mounting a calibrated time dial 66 FIG. 5.

Slide carrier

Inverted U-shaped rod 49 is positioned above the housing and at one end axially secured at 50 to shaft 30. Suspended from its other end 51 is slide carrier 52 within which a larger number of slides may be mounted in compact relationship, FIG. 4.

Turntable motor

Turntable motor 53 is mounted upon platform 12, FIG. 2, and through pulley 54 rotates shaft 55 mounting at its end the eccentric arm 56 with depending pin 57. The latter operatively and successively engages the peripheral radially extending apertures 38 in the wheel 37. This provides a Geneva type of movement, and upon rotation of shaft 55 produces intermittent incremental rotation of wheel 37 and bushing 31 connected thereto; which in turn is secured to turntable 42 for effecting corresponding incremental rotary movements thereof.

Safety interlock

The apertures 38 in Geneva wheel 37 cooperate with a safety interlock assembly which includes detent 58 pivoted at 59 upon plate 12 FIGS. 2 and 3. Said detent is biased at one end by spring 61 so that ball 60 at its opposite end is adapted to move into registry with apertures 38 of wheel 37. In so doing, detent engages arm 62 of the normally open limit switch 63 which in electrical circuit provides power connection to crank motor 23.

The spacing of apertures 38 in wheel 37 corresponds to the spacing of compartments 45 in the turntable so that said compartments are positioned successively in vertical registry with the plane of reciprocal movement of slide carrier 52. Accordingly, until ball 60 registers with an aperture 38 switch 63 will be disengaged and open cutting off power to crank motor 23, which controls vertical immersion movements of the slide carrier 52 down into the respective tank 47 FIG. 1.

Rinsing tank

As shown in FIGS. 1 and 2 the laterally extending bracket 64 on plate 12 mounts the rinsing tank 65 located in a plane in vertical alignment with slide carrier 52, and is arranged directly below turntable 42.

By the control mechanism employed, if no tank 47 is provided for a particular compartment in the turntable, slide carrier 52 will be descend an additional distance through an aperture in said compartment for immersion into rising tank 65 containing water or other rinsing solution, forming a part of the processing cycle.

In the use of the present machine, various staining processes may be provided by which the tissue slides are intermittently and successively immersed for predetermined and different periods of time in the tanks containing various dyes in a process which completes the staining operation. Some of the tanks will contain dyes, rinsing solvents, alcohol or toluol; and the rinsing tank 65 will preferably contain water.

Variable timing of immersion for each compartment

A means is provided for regulating the time of immersion of slide carrier 52 within the various tanks in the various compartments of the horizontally disposed incrementally rotatable turntable 42.

Timer control

Upon each of the end faces 48 corresponding to each compartment 45 there is provided a time dial 66 calibrated at 67 in six second intervals up to 15 minutes, for illustration. A manually rotatable pointer arm 68 is journaled at 69 for registry with said calibrations and mounts on its outer end an outwardly extending control stop 71 for use in conjunction with a timer 72, FIGS. 1, 2, 6 and 7.

Referring to FIG. 5 rotatable pointer arm 68 has a control handle 70 at one end for setting the period of immersion of the slide carrier of the particular corresponding compartment and tank.

Operation of immersion mechanism

In operation crank motor 23 is energized for a limited time so that crank 25 rotates 90° clockwise and under suitable controls stops. This motion through shaft 30 causes a downward movement of slide carrier 52 so that it is immersed within a corresponding tank 47 and stops. The total time that it will be immersed depends upon the time desired and the control means by which the crank motor is reactivated for operation in the reverse direction to return crank 25 to upright position, FIG. 1.

Timer

The timing means is mounted on the housing, FIG. 1 radially outward of the plane of vertical movements of slide carrier 52, and is connected into an electrical circuit with the crank motor. This is to regulate the period of immersion within the particular tank then located opposite timer 72, or the period of immersion of the slide carrier within rinsing tank 65 therebelow. When the crank 25 rotates 90° and stops to start immersion, the timer is actuated to measure out the time that the crank motor remains deenergized.

The timing means incorporates a synchronous timing motor 72', available on the market, which is continuously operable and include a clutch and brake assembly operated by an electrical switch for controlling timed rotation of output shaft 73 which mounts spring biased timer arm 74, FIG. 6. The latter is coaxial of pointer arm 68 and when activated by motor 72' rotates as shown in FIG. 7 in a clockwise direction until the switch 75 and its control arm 76 engages the stop 71 on the adjustable pointer arm 68, FIG. 5.

It is the activation of this switch 75–76 as the timer arm 74 rotates with respect to the timing dial 66 which controls the switching actuater in such a manner as to declutch and stop the rotation of output shaft 73 instantaneously. At the same time timer arm 74 due to its spring bias mounting returns to its zero position and engages switch 77. This switch closes the electrical circuit to crank motor 23 to reverse the direction of rotation of crank 25 for movement in a counter-clockwise direction returning to the position shown in FIG. 1, elevating the slide carrier to the position shown.

The specific construction of the timer forms no part of the present invention except to the extent that motor 72′ drives output shaft 73 and timer arm 74 measuring out the time in seconds until the switch 75–76 engages stop 71 on pointer arm 68 on dial 66. This provides the means by which the period of immersion of the slide carrier within a particular tank may be regulated and controlled. There is a separate dial 66 and pointer arm 68 for each compartment. The timer 72 is employed for controlling the period of immersion of the slide carrier within the successively positioned tanks on the turntable as the turntable is incrementally rotated.

Rinsing control

Normally closed limit switch 90 at the base of each compartment, FIG. 4 is so connected that it will control crank motor 23 for rotation of crank, 25 180° from the position shown in FIG. 1. If no tank is positioned within a particular compartment 45, which would open the normally closed switch 90, then the crank motor when activated will cause crank 25 to rotate 180° as shown in dotted lines. At this time it engages a limit switch to stop rotation. It is this rotation of crank which causes slide carrier 52 to move downwardly through the empty apertured compartment down into rinsing tank 65 directly therebelow. At the same time the timer is actuated and depending upon the setting of pointer arm 68 FIG. 5 corresponding to a particular compartment the time of immersion in the rinsing tank is thus controlled and at the end of that time the timer 72, reactivates motor 23 in the reverse direction for causing the crank 25 to return 180° to the upright position shown in FIG. 1, elevating the slide carrier.

Cycle selector control

In connection with the dial 66 for each compartment a selector control, FIGS. 8 and 9, is arranged upon the inside of each end face 66 coaxial of shaft 69. The selector control includes disk 78 journaled upon shaft 69 and has a central position wherein the depending arm 79 projects forward as at 80 centrally through aperture 81 in end face 48. In this position of the selector control 78 the corresponding tank will be bypassed and the turntable will continue rotating so that the next succeeding tank is positioned below the slide carrier.

The selector control includes a pair of angular opposed radiating arms 82 and 83 whose out turned end portions extend through corresponding apertures 84 in end plate 48 and terminate in control members 85 normally spaced from the normally open switch element 86 of "PROCESS" switch 87 and the normally open switch element 88 of "STOP" switch 89.

By rotating selector control disc 78 clockwise from the position shown in FIG. 8, until the end portion 85 of arm 83 engages switch element 88, the "STOP" switch 89 will be activated so that as the turntable positions this compartment and corresponding tank directly below the slide carrier, the cycle will stop. Turntable motor 53 and crank motor 23 will be deenergized.

By rotating the selector control disc 78 in the opposite direction to a second position the control arm 82 as at 85 will engage contact 86 of "PROCESS" switch 87 so that the timer will be activated for controlling the period of immersion of the slide carrier in a tank and the reactivation of crank motor 23 to elevate the slide carrier from the corresponding tank.

Switches

The following switches are employed in connection with the electrical circuit shown in FIG. 10 for the sequential control and operation of the turntable drive motor 53 and crank motor 23 which operate in a cycle so as to effect intermittent successive rotary movements of turntable 42 and alternate vertical reciprocations of slide carrier 52. The downward movement of the slide carrier is interrupted to maintain the slide carrier within the particular tank for a pre-set period and for automatically actuating the crank motor in the opposite direction for withdrawing the slide carrier.

No. 1.—Interlock switch 62–63, FIGS. 2 and 3, under the control of Geneva movement 37–38 and detent 58 by which until the turntable has been properly located so as to place a compartment and tank therein directly below the slide carrier, the crank motor 23 may not be energized and the slide carrier lowered.

No. 2.—When the crank 25, FIG. 1, has been rotated 90° from the position shown, it engages a normally closed stop switch opening the same to deactivate crank motor 23, and at the same time energize the timer assembly 72 which controls the period of immersion of the slide carrier within the corresponding tank.

No. 3.—A normally open switch 76 on timer arm 74 to deactivate the timer when it engages stop 71.

No. 4.—A normally open first control switch 77 is activated by the timer arm 74, FIG. 7, to energize and effect a reversal of the output shaft 24 of crank motor 23 causing crank 25 to return 90° to the position shown in FIG. 1.

No. 5.—Crank motor cut-off switch is energized by crank 25 when the crank returns to the upright position shown in FIG. 1.

No. 6.—A normally closed second control switch 90 in each of the compartments 45 and which is opened upon positioning of the tank therein. Thus the crank motor 23 will be limited to rotary movements of crank 25, 90° only. However, when the tank has been removed leaving an open space, the normally closed switch 90 remains closed and is intended to control the operation of motor 23 so that the crank 25 rotates 180° to the dotted line position shown. This causes the slide carrier to move downwardly through the aperture of the empty compartment and down into the rinsing tank directly therebelow, FIG. 1.

No. 7.—At this point there is also a normally closed control switch engaged by the crank 25 after rotation 180° to deactivate the crank motor and to start the timer 72. When the timer has been deactivated automatically through engagement of the timer arm switch 75 with stop 71 of pointer arm 64, said arm 74 is automatically returned to its zero position. The switch 77 is again actuated for effecting a reversal of crank motor 23 returning the crank 180° to the position shown in FIG. 1.

No. 8.—The "STOP" switch 89 of FIG. 8 includes a normally closed switch element 88 which when actuated by the selector control arm 83 opens the circuit to both motors for stopping the cycle at any particular tank corresponding to any predetermined position of the turntable such as to end a particular dye process.

No. 9.—A "PROCESS" switch 87 having a normally open contact 86 which when engaged by the selector arm 82 is closed so that when the turntable reaches this particular compartment in registry with the timer the process will function in accordance with the timer control and for the time of immersion set by pointer arm 68 on the dial 66 corresponding to that compartment.

There are a number of switches in the electrical circuit, FIG. 10, by which these results are achieved. With a large number of tanks positioned within the turntable the time of immersion of all of the tanks could be the same or could be varied as desired or a particular tank could be skipped by setting the selector control to the neutral central position shown in FIG. 8 or the cycle could be stopped at that compartment by actuating switch 89 or the cycle could be maintained for continuous incremental and timed rotation of the turntable subsequent to each reversal of the immersing operation of the slide carrier.

*Drying tank*

At least one of the tanks 91, FIG. 2, may be a drying tank containing no dye or solvent. Tank 91 includes a series of electric resistance heating elements 92 and a small fan 93.

*Heated or cooling tanks*

One or more tanks 91 with solution may be insulated and have thermostatically controlled heating elements 92, FIG. 2, allowing them to be maintained at 40–60° C. or 36–40° C. A suitable 110 volt circuit would be provided including movable contacts.

IDENTIFICATION OF COMPONENTS IN DIAGRAM FIG. 10

| Symbol | Unit | Function |
|---|---|---|
| SW-1 | Switch | Power On-Off Switch. |
| SW-2 | Switch No. 2 | Push Button Type to Allow Operator to Select by Manual Override any Sequence Desirable. |
| SW-3 | Switch No. 3 | Two Position Switch for Processing or Loading at the End of Each Complete Cycle. |
| MI | Motor Index | Motor 53 to Drive Turntable Index. |
| ML | Motor Lift/Lower | Motor 23 to Lift/Lower Slide Carrier. |
| MP | Motor Pulsate | Motor 22 to Provide Continual Agitation During Processing. |
| MT | Motor Timer | Motor 72 to Time Pre-Set Interval of Each Station. |
| CRC-1 | Contact Relay Coil No. 1. | Contact Relay to Provide ML 23 Lift. |
| CRC-2 | Contact Relay Coil No. 2. | Contact Relay to Isolate All Other Functions During Index. |
| TDC-1 | Time Delay Coil No. 1. | Time Delay to Allow MI to Move Off Opened Limit Switch. |
| CC-1 | Clutch Coil No. 1 | Motor Clutch which Holds LS-4 from Deactivating until Slide Carrier 52 had Started in Up Direction. |
| LS-1 | Limit Switch No. 1 | Indicates Slide Carrier 52 is in Full Up Position. |
| LS-2 | Limit Switch No. 2 | Indicates Slide Carrier is in Staining Tanks 47. |
| LS-3 | Limit Switch No. 3 | Indicates Slide Carrier is in Rinse Tank 65. |
| LS-4 | Limit Switch No. 4 (76). | Mounted on Timer Arm 74 and Actuates at End of Each Time Interval. |
| LS-5 | Limit Switch No. 5 (86). | Indicates Tissues Should Process and Pass On. |
| LS-6 | Limit Switch No. 6 (88). | Indicates Tissues Should Process and Stop in Down Position. |
| LS-7 | Limit Switch No. 7 (90). | Indicates if Station is to be Staining or Rinsing. |
| P | Plug | Grounded Plug to 110 v. A.C., 60 cycles. |
| F-1 | Fuse | Circuit Breaker Type Fuse. |
| L-1 | Light | Pilot Light. |
| L-2 | do | Blinking Light to Indicate end of cycle. |

*Discription of operation*

After the Tissue Processing Machine is plugged in (P) and the power switch is turned on (SW–1), indicated by pilot light (L–1), the indexing sequence is as follows, with schematic shown in the load mode:

(1) SW–3 is turned to process after the loading is completed.

(2) MI, CRC–2 and TDC–1 are energized causing the table 42 to begin to index to the next station. LS–6 (88) closes in about 2 seconds and TDI–N.C. opens allowing the index motor 53 to stop when LS–5 (86) (9–10) or LS–6 (88) (10–11') is reached.

(3) Actuation of either LS–5 or LS–6 stops MI (53) and opens CRC–2. This causes CR–2 (5–12') to close bringing ML (23) (lower) into operation through LS–2 and LS–3.

(4) The slide carrier 52 continues down until it trips LS–2 (7–16'), if a staining tank 47 is in the station. If it is a rinse station, the head 52 will continue to lower because LS–2 is jumped out by LS–7 (7–16'). LS–3 (16'–17') will now stop the slide carrier 52 when it is immersed in water.

(5) When LS–2 or LS–3 are actuated MP 22, MT 72, and CC–1 will enter the circuit through 7–21'–22' sequence.

(6) LS–4 (76) mounted on the clock arm 74 will allow timing for the set interval. When LS–4 is tripped CRC–1 will energize through the 7–14'–15'–6 route. Note that 14'–15' of SW–2 will be open in the process position, so that if LS–5 (86) is depressed (process and continue), the CRC–1 will energize through 7–14'–15'–6 path; however, if LS–6 (process and stop) (88) has been depressed by that station, the slide carrier 52 will stay in the down position and continue to pulsate until attended by the operator through indication of blinking light L–2.

(7) When ML (23) starts in the lift direction LS–2 and LS–3 will deactivate so that MP 22 and CC–1 will stop. When LS–2 and LS–3 limit switches open ML (23) will continue up through the contacts of CR–1 (7–17').

(8) Once reaching the full up position, LS–1 will trip causing MI (53), CRC–2 and TDC–1 to re-enter the circuit and the cycle will repeat.

(9) Note that the addition of SW–2 to the circuit allows the operator to index the tissue processor to any desired station so that other processing techniques can be tried if desired.

Having described my invention, reference should now be had to the following claims:

1. In a tissue-staining a processing machine, a housing; a crank motor on the housing including an arcuately rotatable intermittently reciprocal crank; an intermittently and vertically reciprocal shaft guidably mounted upon and projecting above the housing flexibly and pivotally connected to said crank; an inverted U-shaped rod at one end axially secured to said shaft; a slide carrier suspended from its other end for reciprocal intermittent movement in a vertical plane; a turntable co-axial of said shaft journaled upon said housing for rotation in a horizontal plane below said slide carrier; the series of apertured support compartments in the turntable arranged in a circle at a radius corresponding substantially to the slide carrier; a plurality of dye and solvent carrying tanks nested respectively in a number of said compartments adapted to receive said slide carrier on downward movement thereof for immersion of tissue carrying slides in said carrier; a motor on the housing connected to the turntable to intermittently rotate the turntable short incremental distances equal to the distance between tank centers; and a stationary rinsing tank mounted upon said housing below said turntable and slide carrier; said slide carrier adapted to drop through an empty compartment of the turntable when stationary for immersion in said rinsing tank.

2. In the tissue-staining and processing machine of claim 1, the crank adapted to reciprocally rotate 90° to cause immersion of said slide carrier in a tank at one position of the turntable; and to reciprocally rotate 180° to cause immersion of said slide carrier in said rinsing tank at another position of said turntable.

3. In the tissue-staining and processing machine of claim 1, a first control means to intermittently actuate and reverse said crank motor and crank in a cycle; and second control means connected to said turntable motor to intermittently actuate the same after the completion of each cycle.

4. In the tissue-staining and processing machine of claim 1, the crank adapted to reciprocally rotate 90° to cause immersion of said slide carrier in a tank;

and to reciprocally rotate 180° to cause immersion of said slide carrier in said rinsing tank;

and switching means connected to said crank motor limiting rotation to 90° when the turntable positions a tank below said slide carrier;

but permits rotation 180° when the corresponding turntable compartment has no tank.

5. In the tissue-staining and processing machine of claim 1, the turntable operating motor including a Geneva movement.

6. In the tissue-staining and processing machine of claim 1, the turntable operating motor including a Geneva movement;

a safety inter-lock including a normally open switch in a circuit to said crank motor and;

a spring biased detent registerable with and moveable into openings in said Geneva movement corresponding to locations of the turntable compartments and in registry with said slide carrier, in turn closing said normally open switch.

7. In the tissue-staining and processing machine of claim 1, said turntable having angularly related upright end faces at the outer end of each compartment arranged in a circle;

a calibrated time dial on each face;

a manually rotatable pointer arm on each dial carrying a control stop for presetting the period of immersion of the slide carrier in the tank corresponding to said face;

and a timing means mounted on said housing radially outward of said slide carrier connected into an electrical circuit to said crank motor for regulating the period of immersion in the tank then located opposite said timer or in the rinsing tank therebelow;

said timing means including a power rotated spring biased timer arm co-axial of said pointer arm having a zero position and on engagement with said stop adapted for automatic deactivation and return to its zero position to actuate and reverse said crank motor.

8. In the tissue-staining and processing machine of claim 1, said turntable having angularly related upright end faces at the outer end of each compartment arranged in a circle;

a calibrated time dial on each face;

a manually rotatable pointer arm on each dial carrying a control stop for presetting the period of immersion of the slide carrier in the tank carresponding to said face;

and a timing means mounted on said housing radially outward of said slide carrier connected into an electrical circuit to said crank motor for regulating the period of immersion in the tank then located opposite said timer or in the rinsing tank therebelow;

said timing means included a power rotated spring biased timer arm co-axial of said pointer arm having a zero position and on engagement with said stop adapted for automatic deactivation and return to its zero position to actuate and reverse said crank motor;

said circuit including a normally open safety interlock switch connected to said crank motor and closeable on predetermined rotation of the turntable;

a normally closed stop switch engageable by said crank arm when rotated 90° to de-energize the crank motor and start the timing means;

and a normally open first control switch connected to said crank motor on automatic deactivation and return of said timer arm closing said first control switch.

9. In the tissue-staining and processing machine of claim 1, said turntable having angularly related upright end faces at the outer end of each compartment arranged in a circle;

a calibrated time dial on each face;

a manually rotatable pointer arm on each dial carrying a control stop for presetting the period of immersion of the slide carrier in the tank corresponding to said face;

and a timing means mounted on said housing radially outward of said slide carrier connected into an electrical circuit to said crank motor for regulating the period of immersion in the tank then located opposite said timer or in the rinsing tank therebelow;

said timing means including a power rotated spring biased timer arm co-axial of said pointer arm having a zero position and on engagement with said stop adapted for automatic deactivation and return to its zero position to actuate and reverse said crank motor;

said circuit including a normally open safety interlock switch connected to said crank motor and closeable on predetermined rotation of the turntable;

a normally closed stop switch engageable by said crank arm when rotated 90° to de-energize the crank motor and start the timing means;

and a normally open first control switch connected to said crank motor on automatic deactivation and return of said timer arm closing said first control switch;

and a normally closed second control switch in each compartment for actuating the crank motor for rotation of the crank arm 180°;

a tank positioned in any compartment de-energizing and opening said switch;

and a normally closed stop switch engageable by said crank arm when rotated 180° to de-energize the crank motor and start the timing means.

10. In the tissue-staining and processing machine of claim 1, a platform pivotally mounted on said housing supporting said crank motor;

and a power rotated cam supportably engaging said platform effecting continuous vibrations of said crank motor, crank, connected shaft and slide carrier.

11. In the tissue-staining and processing machine of claim 1, said turntable having angularly related upright end faces at the outer end of each compartment arranged in a circle;

a calibrated time dial on each face;

a manually rotatable pointer arm on each dial carrying a control stop for presetting the period of immersion of the slide carrier in the tank corresponding to said face;

and a timer mounted on said housing radially outward of said slide carrier connected into the circuit to said crank motor and registerable with said stop;

and a selector control on each compartment face including a central neutral position;

a stop switch connected to the turntable and crank motors and a normally open process switch connected to said crank motor;

and a pair of radiating arms extending from said selector control adapted on rotary adjustments in one of two directions to actuate said stop switch to deactivate the turntable and crank motors, and in a second position actuate said process switch to energize said timer.

12. In the tissue-staining and processing machine of claim 1, a first control means to intermittently actuate and reverse said crank motor and crank in a cycle;

second control means connected to said turntable motor to intermittently actuate the same after the completion of each cycle;

and third control means to allow a station to be skipped entirely.

13. In the tissue-staining and processing machine of claim 1, a first control means to intermittently actuate and reverse said crank motor and crank in a cycle;

second control means connected to said turntable motor to intermittently actuate the same after the completion of each cycle;

third control means to allow a station to be skipped entirely;

and fourth control means to allow the turntable motor to be deactivated to stop the process at any station.

References Cited by the Examiner

UNITED STATES PATENTS 1,795,167 3/1931 Gross _____ 134—58 X
2,886,046 5/1959 DuGal _____ 134—58

CHARLES A. WILLMUTH, *Primary Examiner.*

R. L. BLEUTGE, *Assistant Examiner.*